(12) United States Patent
Zhang et al.

(10) Patent No.: US 12,081,110 B2
(45) Date of Patent: Sep. 3, 2024

(54) POWER CONVERSION MODULE AND POWER CONVERTER

(71) Applicant: Nanjing Silergy Micro Technology Co., Ltd., Nanjing (CN)

(72) Inventors: Zhen Zhang, Nanjing (CN); Wang Zhang, Nanjing (CN); Junyan Sun, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 74 days.

(21) Appl. No.: 17/941,716

(22) Filed: Sep. 9, 2022

(65) Prior Publication Data

US 2023/0102822 A1 Mar. 30, 2023

(30) Foreign Application Priority Data

Sep. 24, 2021 (CN) .......................... 202111123862.X

(51) Int. Cl.
*H02M 3/158* (2006.01)
*H02M 1/00* (2006.01)
*H02M 1/14* (2006.01)

(52) U.S. Cl.
CPC ............. *H02M 1/007* (2021.05); *H02M 1/14* (2013.01); *H02M 3/1584* (2013.01)

(58) Field of Classification Search
CPC ............. H02M 1/0067–0077; H02M 3/07–078
See application file for complete search history.

(56) References Cited

U.S. PATENT DOCUMENTS

| | | | |
|---|---|---|---|
| 8,581,518 B2 | 11/2013 | Kuang et al. | |
| 2011/0127925 A1 | 6/2011 | Huang et al. | |
| 2012/0286854 A1* | 11/2012 | Swonger ................. | H02M 3/07 327/535 |
| 2017/0318639 A1 | 11/2017 | Wang et al. | |
| 2018/0026526 A1* | 1/2018 | Ahmed .................... | H02M 3/07 323/271 |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0099302 A1* | 3/2020 | Webb ...................... | H02M 3/158 |
| 2020/0177081 A1* | 6/2020 | Huang .................... | H02M 3/07 |
| 2021/0359606 A1 | 12/2021 | Han et al. | |
| 2022/0029540 A1 | 1/2022 | Zhang et al. | |
| 2023/0013025 A1* | 1/2023 | Kumar ................ | H02M 1/0095 |

* cited by examiner

*Primary Examiner* — Peter M Novak

(57) ABSTRACT

A power conversion module can include: an i-th level structure comprising $2^{i-1}$ basic units, a second terminal of each basic unit in each level structure respectively connected to first terminals of two basic units in a next level structure, where a first terminal of a first basic unit in a first-level structure is used as a first terminal of the power conversion module; an N-th level structure comprising $2^{N-1}$ balance units, where second terminals of each balance unit are connected as a second terminal of the power conversion module, and second terminals of each basic unit in an (N−1)th level structure are respectively connected to first terminals of two balance units in the N-th level structure; and where each basic unit comprises a switched capacitor circuit, N is a positive integer greater than or equal to 2, i is a positive integer, and $1 \leq i \leq N-1$.

20 Claims, 12 Drawing Sheets

POWER CONVERSION MODULE AND POWER CONVERTER

RELATED APPLICATIONS

This application claims the benefit of Chinese Patent Application No. 202111123862.X, filed on Sep. 24, 2021, which is incorporated herein by reference in its entirety.

FIELD OF THE INVENTION

The present invention generally relates to the field of power electronics, and more particularly to power conversion modules and converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
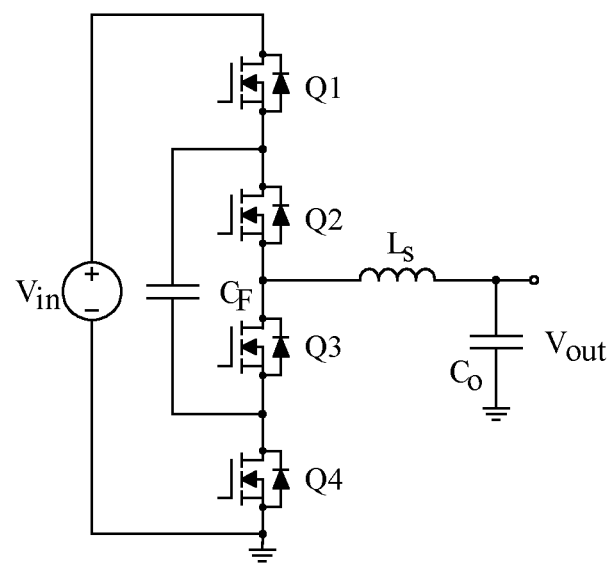
FIG. 1 is a schematic diagram of an example three-level Buck DC-DC power converter.

FIG. 1 illustrates an example three-level Buck DC-DC power converter. As compared with a traditional Buck circuit, the withstand voltage of each power transistor is half of DC bus voltage $V_{in}/2$. Thus, the power transistors with lower withstand voltage levels can be used. The switching of each power transistor can reduce the voltage ripple on the inductor, and a smaller inductor can be used, thereby increasing the power density. However, the three-level Buck DC-DC power converter may not automatically achieve the voltage balance of flying capacitor $C_F$ due to the working mode of the circuit itself. That is, it may not automatically achieve the voltage across flying capacitor $V_{CF}$ equal to $V_{in}/2$. Therefore, sampling the voltage across flying capacitor $V_{CF}$ and reaching the voltage balance across the capacitor through an additional control strategy may be needed.

Figure 2:
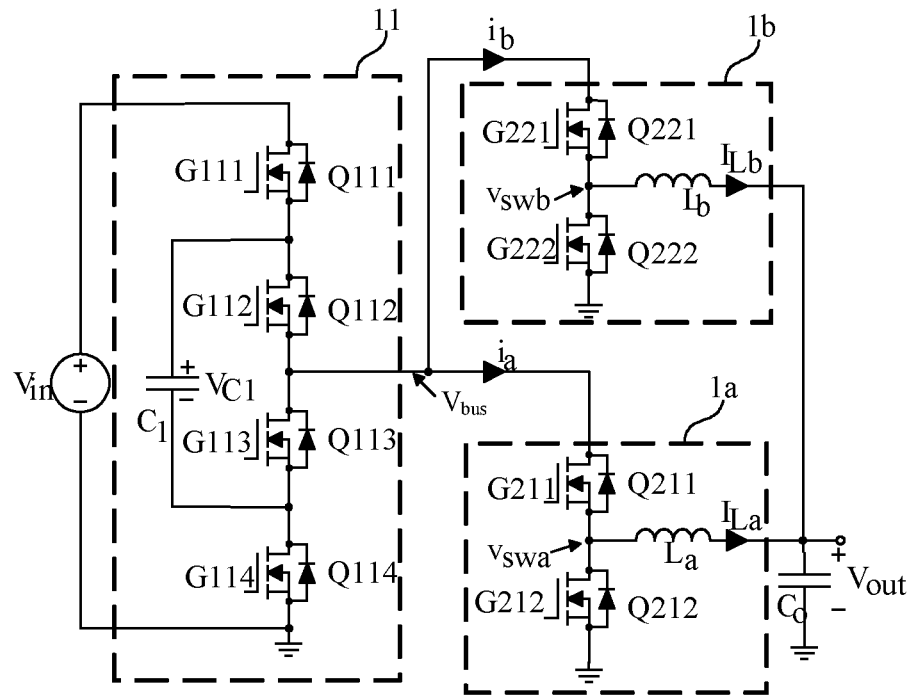
FIG. 2 is a schematic diagram of a first example power conversion module, in accordance with embodiments of the present invention.

Referring now to FIG. 2, shown is a schematic diagram of a first example power conversion module, in accordance with embodiments of the present invention. In this particular example, a power conversion module or circuit can include a two-stage structure (e.g., N=2). The first-level structure can include a basic unit 11, and the second-level structure can include two balance units 1a and 1b. The second terminals of each balance unit can connect as the output terminal of the power conversion module. The second terminal of the first base unit 11 in the first-level structure can connect to the first terminals of the first balance unit 1a and the second balance unit 1b in the second-level structure. The first terminal of basic unit 11 in the first-level structure can connect to the external power supply as the input terminal of the power conversion module. In this example, the c-th switch in the b-th basic unit (or the b-th balance unit) in the a-level structure is represented by $Q_{abc}$, the corresponding driving signal is represented by $G_{abc}$, and each switch is turned on at a high level and turned off at a low level. For example, the first switch in the first basic unit (or the first balance unit) in the second-level structure is represented by $Q_{211}$, and the corresponding driving signal is represented by $G_{211}$. When $G_{211}$ is high, Q211 is turned on, and when $G_{211}$ is low, Q211 is turned off.

Furthermore, the switching frequency of each balance unit 1a and 1b is the same, and the first and second switches in the same balance unit can operate in a complementary manner, which is the synchronous rectification mode. For example, the second switch in each balance unit can be replaced by a diode for freewheeling. In addition, the duty ratios of the first switches in each balance unit can be the same, and the first switches in the two balanced units connected to the same basic unit can be under phase-shifted control (e.g., with a phase difference of 180°). In other words, the switches Q221 and Q222 can be complementarily turned on, switches Q211 and Q212 can be complementarily turned on, and the duty ratios of the switches Q221 and Q211 may be the same, whereby the conduction phase differs by 180°.

As shown in FIG. 2, basic unit 11 can include flying capacitor C1 and four switches sequentially connected in series between the first terminal of basic unit 11 and the reference ground: switches Q111, Q112, Q113, and Q114. Flying capacitor C1 can connect between the first connection terminal and the second connection terminal, where the first connection terminal is the common connection terminal of switches Q111 and Q112, the second connection terminal is the common connection terminal of switches Q113 and Q114, and the the common connection terminal of switches Q112 and Q113 is the output terminal of basic unit 11. The switching states of the first switch and the third switch in each basic unit can be the same, and the switching states of the second switch and the fourth switch may be the same and complementary to the switching state of the first switch. That is, the switching states of switches Q111 and Q113 in basic unit 11 can be the same, and the switching states of switches Q112 and Q114 may be the same and complementary to the switching state of switch Q111. For example, the duty ratio of the driving signal of each switch in basic unit 11 is 0.5. By switching the state of the switch in basic unit 11, flying capacitor C1 can transition between the charging state and the discharging state. In the charging state, flying capacitor C1 can connect in series between the input terminal and the output terminal of basic unit 11 where flying capacitor C1 is located. In the discharge state, flying capacitor C1 can connect in series between the reference ground and the output terminal of basic unit 11 where flying capacitor C1 is located.

It should be noted that the composition of basic unit 11, the composition of the balance units 1a and 1b, and the relationship between the driving signals of the switches in the structures of all levels are not limited to these particular examples. In certain embodiments, other composition and driving signal that can realize the voltage balance across the flying capacitors in the basic unit and the current balance of the output currents of each balance unit can be utilized.

As shown in FIG. 2, the balance unit is a Buck circuit, and can include: an inductor and two switches sequentially connected in series between the input terminal of the balance unit and the reference ground. The common connection terminal of the first switch and the second switch can connect to one terminal of the inductor, and the other terminal of the inductor is used as the output terminal of the balance unit. By switching the state of the switch in the balance unit, the inductor can be switched between storing magnetic energy and releasing magnetic energy, in order to maintain the output voltage Vout and the output current of each balance unit.

Figure 3:
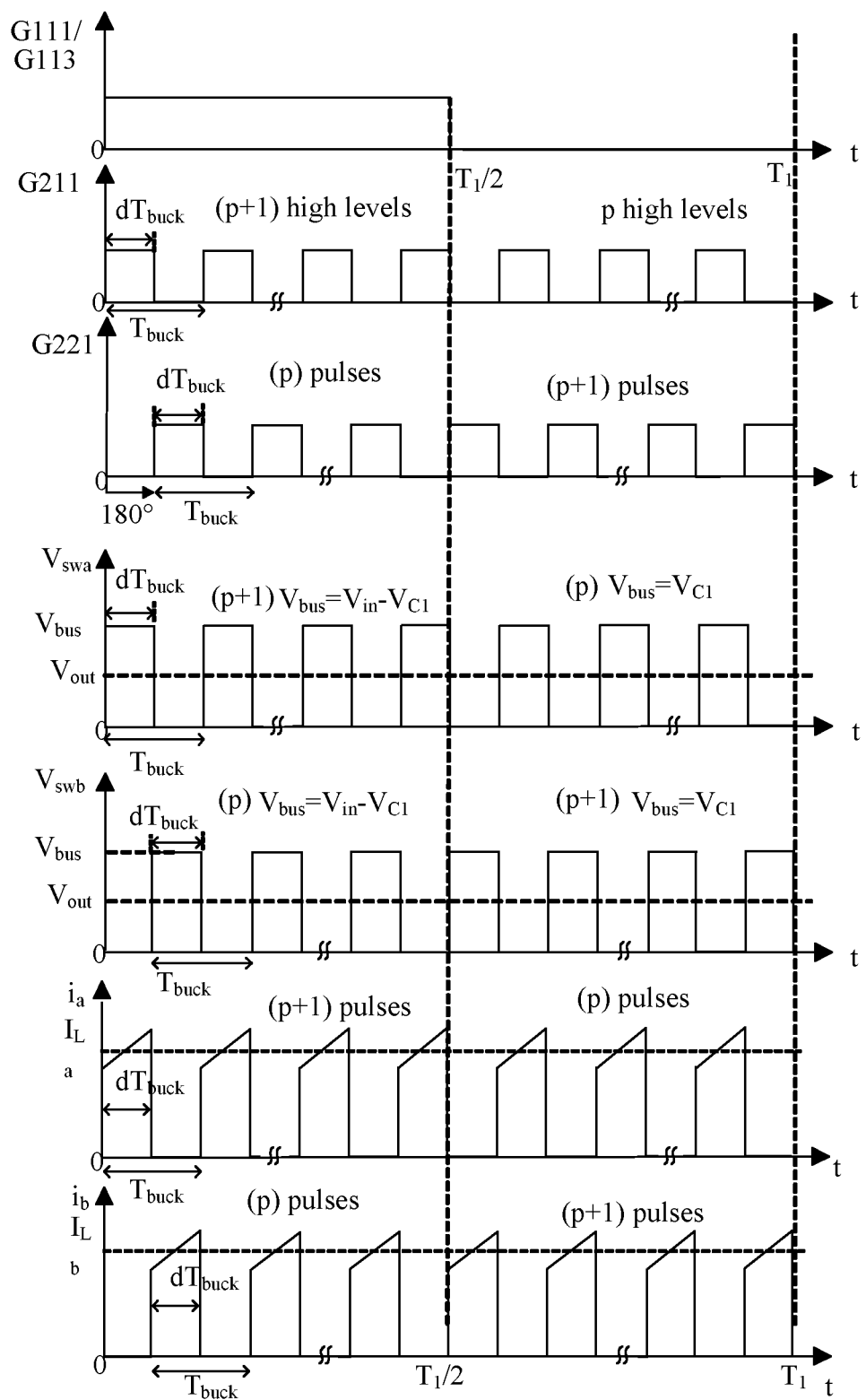
FIG. 3 is a waveform diagram of first example operation of the first power conversion module, in accordance with embodiments of the present invention.

Referring now to FIG. 3, shown is a waveform diagram of first example operation of the first power conversion module, in accordance with embodiments of the present invention. Shown in FIG. 3 are respectively driving signals G211 and G221 of switches Q211 and Q221 of each balance unit and basic unit 11, and the waveforms of voltages $V_{swa}$ and $V_{swb}$ at the common connection terminal of the two switches and currents $i_a$ and $i_b$ flowing into the first terminals of the two balance units. The switching period (corresponding to the period of the driving signal) of the four switches G111, G112, G113, and G114 in the basic unit is $T_1$, and the switching frequency (corresponding to the frequency of the driving signal) is $f_1=1/T_1$. The switching periods of the switches in each balance unit are the same as $T_{buck}$, the frequency is $f_{buck}=1/T_{buck}$, the duty ratio of the first switch in each balance unit is d (e.g., d≤0.5). Also, the switching frequency of the switches in the balance unit is an odd multiple of that of the basic unit; that is, $f_{buck}=(2p+1) \cdot f_1$, where p=0, 1, 2, 3, and so on.

As shown in FIG. 2, the voltage at the common input terminal of the two balance units 1a and 1b is $V_{bus}$, and the output voltage of the power conversion module is $V_{out}$. The voltages $V_{swa}$ and $V_{swb}$ at the common connection terminals of the first switch and the second switch in the two balance units can change between $V_{bus}$ and 0V (when switch Q211 in the first balance unit is turned on, $V_{swa}=V_{bus}$; when switch Q211 in the first balance unit is turned off, $V_{swa}=0$. Similarly, when switch Q221 in the second balance unit is turned on, $V_{swb}=V_{bus}$; when switch Q221 in the second balance unit is turned off, $V_{swb}=0$). When switches Q111 and Q113 in basic unit 11 are turned on, corresponding to the interval [0, $T_1/2$] in FIG. 3, $V_{bus}=V_{in}-V_{C1}$. When switches Q111 and Q113 are turned off, that is, in the interval [$T_1/2$, $T_1$], $V_{bus}=V_{C1}$, where $V_{in}$ is the voltage of the external power supply.

As shown in FIG. 3, the duty ratio of the driving signal of the switch in the basic unit is 0.5, and the duty ratios of the driving signals of the first switches in each balance unit 1a and 1b are equal. The rising edge of driving signal G211 of switch Q211 in the first balance unit 1a can be aligned with the rising edges of the driving signals G111 and G113 of switch Q111 and switch Q113 in basic unit 11. The driving signal G221 of switch Q221 in the second balance unit 1b may lag 180° behind driving signal G211 of switch Q211 in the first balance unit 1a; that is, lags $T_{buck}/2$. As such, in the first half switching cycle [0, $T_1/2$] when switches Q111 and Q113 in basic unit 11 are turned on, when the duty ratio d of the driving signal of the first switch in the balance unit is ≤0.5, driving signal G211 of switch Q211 in the first balance unit 1a may have p+1 high voltage levels and p low voltage levels. Driving signal G221 of switch Q221 in the second balance unit 1b may have p high voltage levels and p+1 low voltage levels. During the half switching period [$T_1/2$, $T_1$] when switch Q111 and switch Q113 in the first level structure are turned off, driving signal G211 of switch Q211 in the first balance unit 1a has p high voltage levels and p+1 low voltage levels, and driving signal G221 of switch Q221 in the second balance unit 1b has p+1 high voltage levels and p low voltage levels.

When the circuit operates in a steady state, according to the volt-second balance of the inductor, in one switching cycle of the basic unit, that is, in the interval [0, $T_1$], the voltages $V_{swa}$ and $V_{swb}$ at the common terminals of the first switch and the second switch in the two balance units satisfy the following equations, where $V_{out}$ is the average value of the output voltage.

$$\frac{1}{T_1} \int_0^{T_1} v_{swa} dt = V_{out} \quad (1)$$

$$\frac{1}{T_1} \int_0^{T_1} v_{swb} dt = V_{out} \quad (2)$$

The equations (1) and (2) can be converted into:

$$\frac{1}{T_1}[(V_{in} - V_{C1}) \cdot d \cdot T_{buck} \cdot (p+1) + V_{C1} \cdot d \cdot T_{buck} \cdot p] = V_{out} \quad (3)$$

$$\frac{1}{T_1}[(V_{in} - V_{C1}) \cdot d \cdot T_{buck} \cdot p + V_{C1} \cdot d \cdot T_{buck} \cdot (p+1)] = V_{out} \quad (4)$$

In addition, when the power conversion module operates in a steady state, in the interval [0, $T_1/2$], flying capacitor C1 can be charging. In the interval [$T_1/2$, $T_1$], flying capacitor C1 is always discharging, and the charge and discharge are balanced at steady state. That is, the ampere-second balance equation for flying capacitor C1 can be written as follows:

$$\int_0^{T_1/2} i_a dt + \int_0^{T_1/2} i_b dt = \int_{T_1/2}^{T_1} i_a dt + \int_{T_1/2}^{T_1} i_b dt \qquad (5)$$

When the duty ratio d of the driving signal of the first switch in the balance unit is less than and equal to 0.5, according to $i_a$ and $i_b$ in FIG. 3, equation (6) can be obtained.

$$I_{La} \cdot d \cdot T_{buck} \cdot (p+1) + I_{Lb} \cdot d \cdot T_{buck} \cdot p = I_{La} \cdot d \cdot T_{buck} \cdot p + I_{Lb} \cdot d \cdot T_{buck} \cdot (p+1) \qquad (6)$$

Here, $I_{La}$ and $I_{Lb}$ are the average values of the currents flowing through the first inductor $L_a$ and the second inductor $L_b$ in the two balance units respectively.

Figure 4:
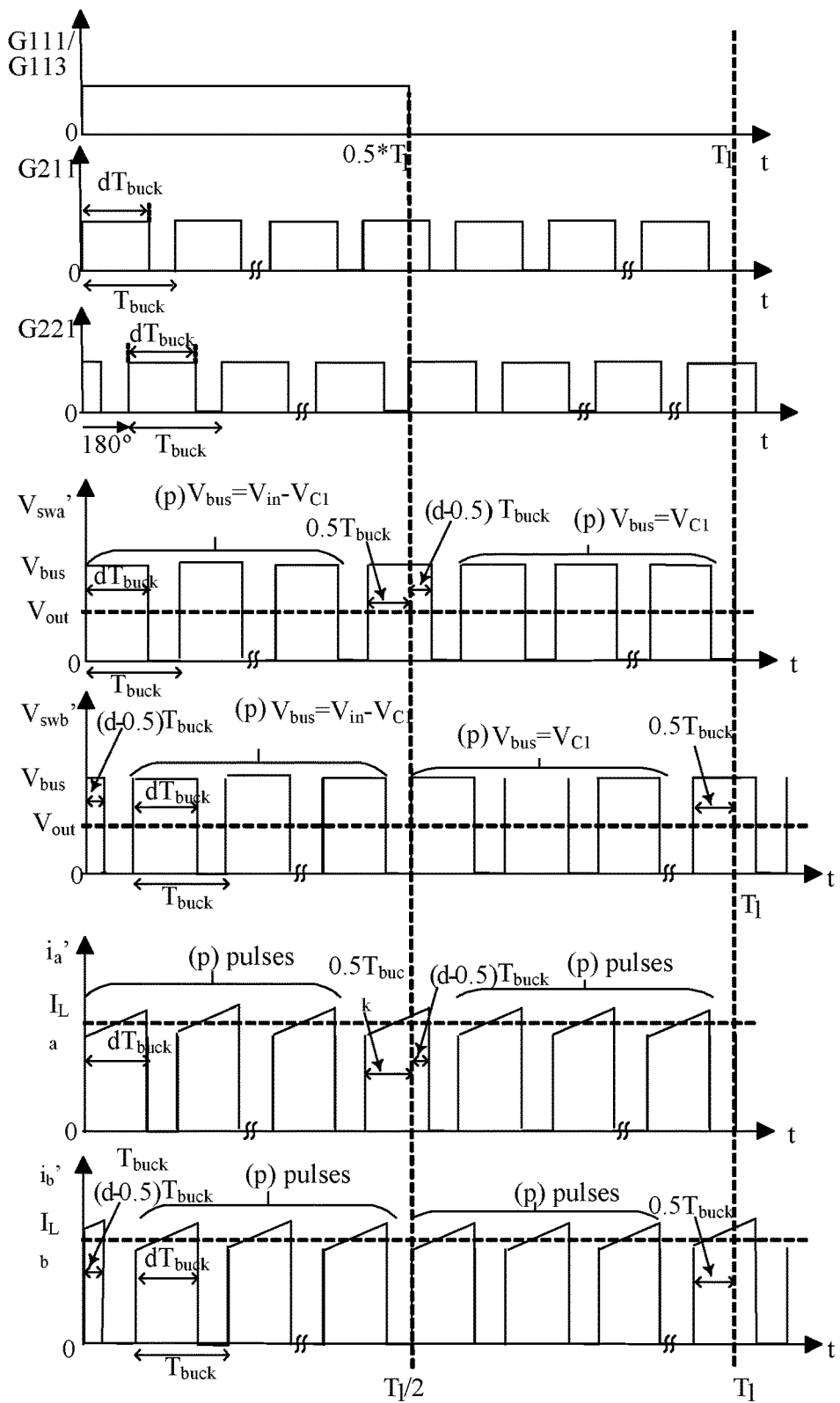
FIG. 4 is a waveform diagram of second example operation of the first power conversion module, in accordance with embodiments of the present invention.

Referring now to FIG. 4, shown is a waveform diagram of second example operation of the first power conversion module, in accordance with embodiments of the present invention. The difference from FIG. 3 is that in this example, the duty ratio of the first switch in each balance unit is greater than 0.5. When the duty ratio d of the driving signal of the first switch in the two balance units is greater than 0.5, according to $V_{swa}'$ and $V_{swb}'$ in FIG. 4, the equations (1) and (2) can be transformed into:

$$\frac{1}{T_1}[(V_{in} - V_{C1}) \cdot d \cdot T_{buck} \cdot p + (V_{in} - V_{C1}) \cdot 0.5 \cdot T_{buck} + \qquad (7)$$
$$V_{C1} \cdot d \cdot T_{buck} \cdot p + V_{C1} \cdot (d - 0.5) \cdot T_{buck}] = V_{out}$$

$$\frac{1}{T_1}[(V_{in} - V_{C1}) \cdot d \cdot T_{buck} \cdot p + \qquad (8)$$
$$(V_{in} - V_{C1}) \cdot (d - 0.5) \cdot T_{buck} + V_{C1} \cdot d \cdot T_{buck} \cdot p + V_{C1} \cdot 0.5 \cdot T_{buck}] = V_{out}$$

By combining equations (3) and (4), and combining equations (7) and (8), equation (9) can be obtained. It can be proved accordingly that no matter the duty ratio d of the driving signal of the first switch of the balance unit is ≤0.5 or >0.5, the voltage $V_{C1}$ of flying capacitor C1 can be automatically balanced.

$$V_{C1} = \frac{V_{in}}{2} \qquad (9)$$

Similarly, when the duty ratio d of the driving signal of the first switch in the balance unit is greater than 0.5, according to $i_a'$ and $i_b'$ in FIG. 4, equation (5) can be further transformed into equation (10):

$$I_{La} \cdot d \cdot T_{buck} \cdot p + I_{La} \cdot 0.5 \cdot T_{buck} + I_{Lb} \cdot (d-0.5) \cdot T_{buck} + I_{Lb} \cdot d \cdot T_{buck} \cdot p = I_{La} \cdot (d-0.5) \cdot T_{buck} + I_{La} \cdot d \cdot T_{buck} \cdot p + I_{Lb} \cdot d \cdot T_{buck} \cdot p + I_{Lb} \cdot 0.5 \cdot T_{buck} \qquad (10)$$

Equation (11) can be obtained by simplifying equations (6) and (10). It can be proved that no matter the duty ratio of the driving signal of the first switch in the balance unit is ≤0.5 or >0.5, the output currents of the two balance units are equal. That is, they are automatically equalized.

$$I_{La} = I_{Lb} \qquad (11)$$

It should be noted that when the frequency of the driving signal in the balance unit is an even multiple of that of the driving signal in the basic unit, that is, when $f_{Buck}=2p \cdot f_1$, equations (3) and (4) are identical, equations (7) and (8) are identical, so equation (9) may not be derived. In the same way, equation (6) and equation (10) are identical, so equation (11) may not be deduced. That is, it cannot be achieved that the voltage of the flying capacitor can be automatically balanced, and the output currents of each balance unit can be automatically equalized.

Figure 5:
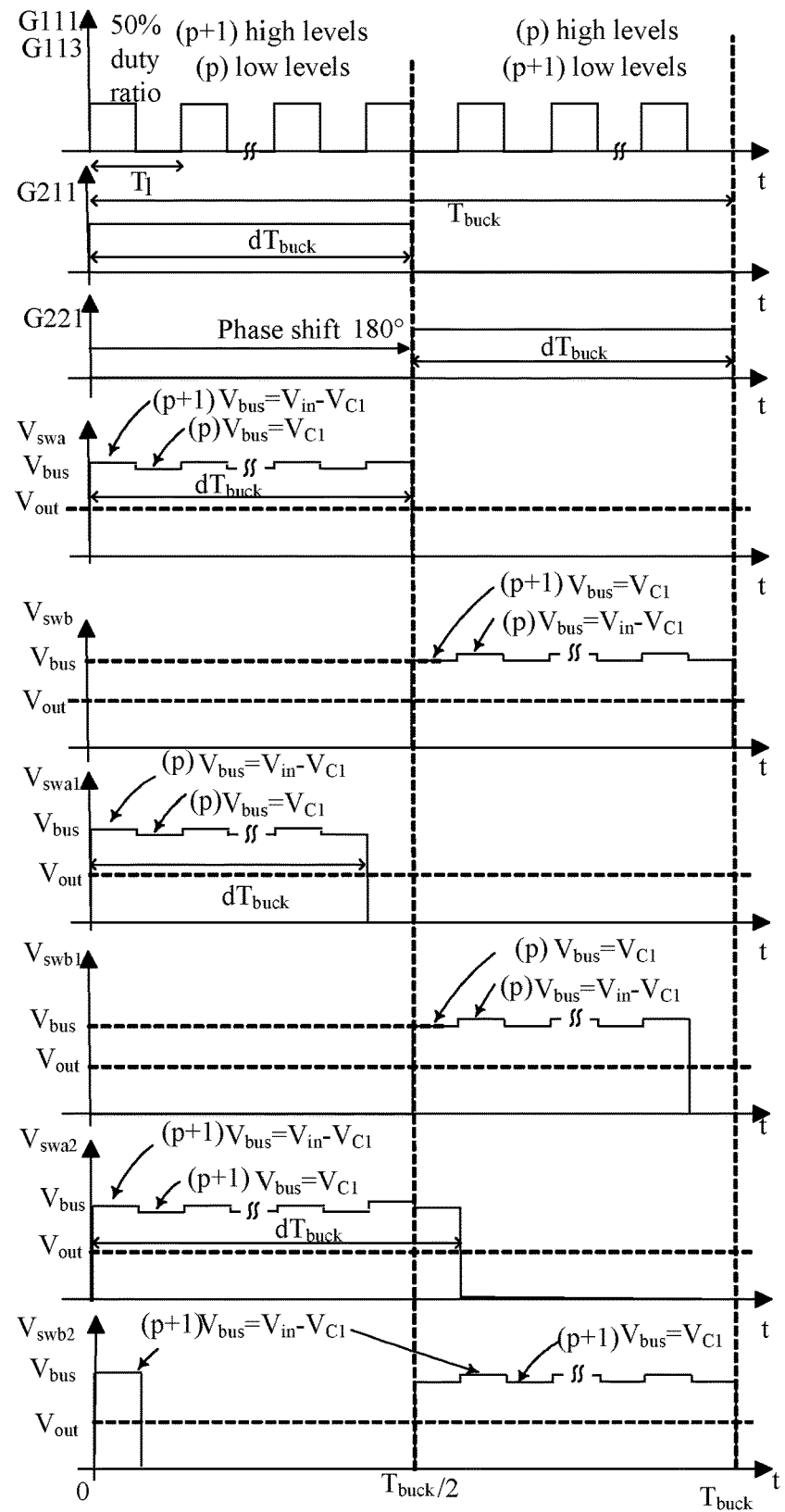
FIG. 5 is a waveform diagram of third example operation of the first power conversion module, in accordance with embodiments of the present invention.

In addition, when the frequency of the driving signal of the switch in the basic unit is an odd multiple of the frequency of the driving signal in the balance unit; that is, $f_1 = (2p+1) \cdot f_{buck}$, where p=0, 1, 2, 3 . . . , and an example working waveform of the power conversion module is shown in FIG. 5. In the period [0, $T_{buck}$] of the balance unit, when driving signals G111 and G113, G211, or G221 are all high voltage levels, $V_{bus} = V_{in} - V_{C1}$. When driving signals G111 and G113 are low voltage levels and G211 or G221 is high voltage level, $V_{bus} = V_{C1}$. When the duty ratio of the driving signal of the first switch in the balance unit is d=0.5, the voltages at the common terminals of the two switches in the two balance units 1a and 1b are shown as $V_{swa}$ and $V_{swb}$ in FIG. 5. During interval [0, $T_{buck}/2$], the time for $V_{swa} = V_{in} - V_{C1}$ is $(p+1) \cdot T_1/2$, and the time for $V_{swa} = V_{C1}$ is $p \cdot T_1/2$. In the interval [$T_{buck}/2$, $T_{buck}$], the time for $V_{swb} = V_{C1}$ is $(p+1) \cdot T_1/2$, and the time for $V_{swb} = V_{in} - V_{C1}$ is $p \cdot T_1/2$. According to the volt-second balance of the first inductor La and the second inductor Lb, the equations (1) and (2) can be obtained to be the same as the equations (3) and (4), and then the equation (9) can be derived. Namely, the voltage balance of the flying capacitors can be achieved automatically.

When the duty ratio d of the driving signal of the first switch in the balance unit is less than 0.5, the voltages at the common terminals of the two switches in the two balance units 1a and 1b are shown as $V_{swa1}$ and $V_{swb1}$ in FIG. 5. In a period [0, $T_{buck}$], both $V_{swa1}$ and $V_{swb1}$ are equal to $V_{bus}$, and in this interval, the time for $V_{swa1} = V_{in} - V_{C1}$ is $p \cdot T_1/2$, and the time for $V_{swa1} = V_{C1}$ is $p \cdot T_1/2$, the time for $V_{swb1} = V_{in} - V_{C1}$ is $p \cdot T_1/2$, and the time for $V_{swb1} = V_{C1}$ is $p \cdot T_1/2$. Therefore, the time for $V_{bus} = V_{in} - V_{C1}$ in $V_{swa1}$ and $V_{swb1}$ is equal, both are $p \cdot T_1/2$, and the time for $V_{bus} = V_{C1}$ in $V_{swa1}$ and $V_{swb1}$ is equal, both are $p \cdot T_1/2$. That is, there is a situation where equation (1) and equation (2) are identical, and equation (9) cannot be obtained. Similarly, in the case that the duty ratio d of the driving signal of the first switch in the balance unit is greater than 0.5, when the voltages at the common terminals of the two switches in the two balance units are $V_{swa2}$ and $V_{swb2}$ in FIG. 5, the time for $V_{bus} = V_{in} - V_{C1}$ in $V_{swa2}$ and $V_{swb2}$ is equal, both are $(p+1) T_1/2$, and the time for $V_{bus} = V_{C1}$ in $V_{swa2}$ and $V_{swb2}$ is equal, both are $(p+1) T_1/2$. That is, there will be the situation that equations (1) and (2) are identical. Namely, when the frequency of the driving signal of the switch in the basic unit is an odd multiple of the frequency of the driving signal in the balance unit, when d≠0.5, the voltage balance of the flying capacitor cannot be automatically achieved.

Figure 6:
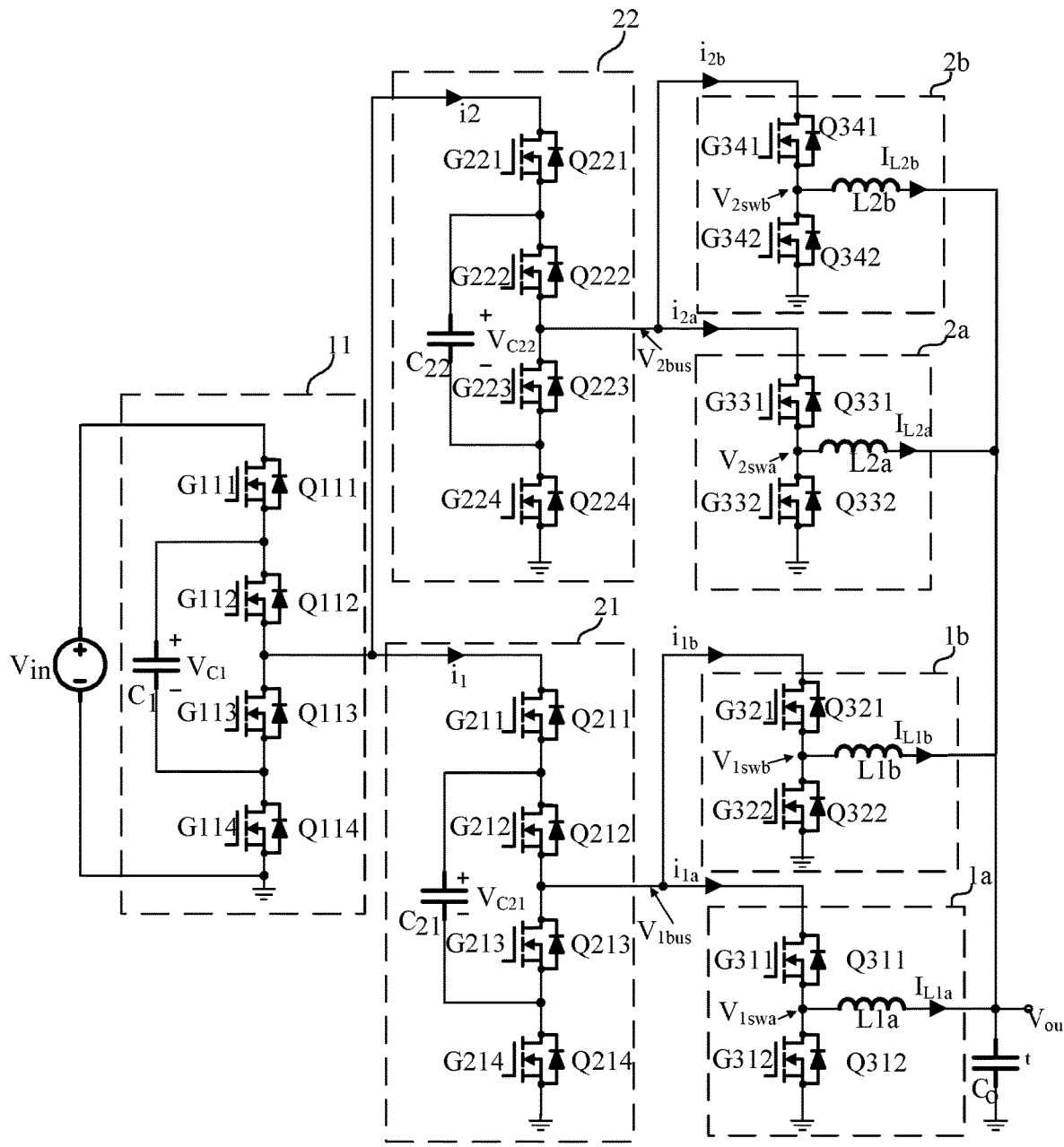
FIG. 6 is a schematic diagram of a second example power conversion module, in accordance with embodiments of the present invention.

Referring now to FIG. 6, shown is a schematic diagram of a second example power conversion module, in accordance with embodiments of the present invention. In this example, N=3, and the power conversion module can include a three-level structure: the first-level structure can include one basic unit 11, the second-level structure can include two basic units 21 and 22, and the third-level structure can include four balance units 1a, 1b, 2a, 2b. The second terminal of the first basic unit 11 in the first-level structure is connected to the first terminals of the first basic unit 21 and the second basic unit 22 in the second-level structure.

The second terminal of the first basic unit 21 in the second-level structure is connected to the first terminals of the first balance unit 1a and the second balance unit 1b in the third-level structures. The second terminal of the second basic unit 22 in the second-level structure is connected to the first terminals of the third balance unit 2a and the fourth balance unit 2b in the third-level structure. The first terminal of the first basic unit 11 in the first-level structure is connected to the external power supply as the input terminal of the power conversion module, and the second terminals of each balance unit are connected as the output terminal of the power conversion module.

The composition of each basic unit and the balance unit and the relationship between the driving signals of each switch in the same basic unit or balance unit are the same as those of the power conversion module with N=2, and the duty ratio of each switch in each basic unit is 0.5. The first switches in the two basic units in the next level structure connected to the second terminal of the same basic unit is controlled with a difference phase of 180° (namely, the switching states are complementary; that is, the switching states of the switches Q211 and Q221 are complementary). The duty ratios of the first switches in each balance unit are the same, and the first switches in the two balance units connected to the second terminal of the same basic unit are under phase-shifted control, with a phase difference of 180°.

The switching period of the switches in the first-level structure is $T_1$, and the frequency is $f_1=1/T_1$. The switching period of the switches in the second-level structure is $T_2$, and the frequency is $f_2=1/T_2$, where $f_2=(2q+1) f_1$, or $f_1=(2q+1) f_2$, where q=0, 1, 2, 3 . . . . The switching period of each balance unit in the third-level structure is the same as $T_{buck}$, the switching frequency is $f_{buck}=1/T_{buck}$, and the duty ratio of the driving signal of the first switch in each balance unit is d (0<d<1). The switching frequency $f_{Buck}$ of the switches in the balance unit in the third-level structure is an odd multiple of the highest switching frequency in all basic units. That is, when $f_2=(2q+1) f_1$, $f_{Buck}=(2p+1) f_2$; when $f_1=(2q+1) f_2$, $f_{Buck}=(2p+1) f_1$, where p=0, 1, 2, 3, and so on.

It should be noted that if the switching frequency of the switches in the second-level structure is an even multiple of that of the first-level structure. That is, $f_2=2q \cdot f_1$, where p=0, 1, 2, 3 . . . (or conversely $f_1=2q \cdot f_2$), or if the frequency of the driving signal of the switches in the balance unit is an even multiple of the highest switching frequency among all the basic units, the power conversion module may not be able to automatically achieve voltage equalization and current equalization.

Figure 7A:
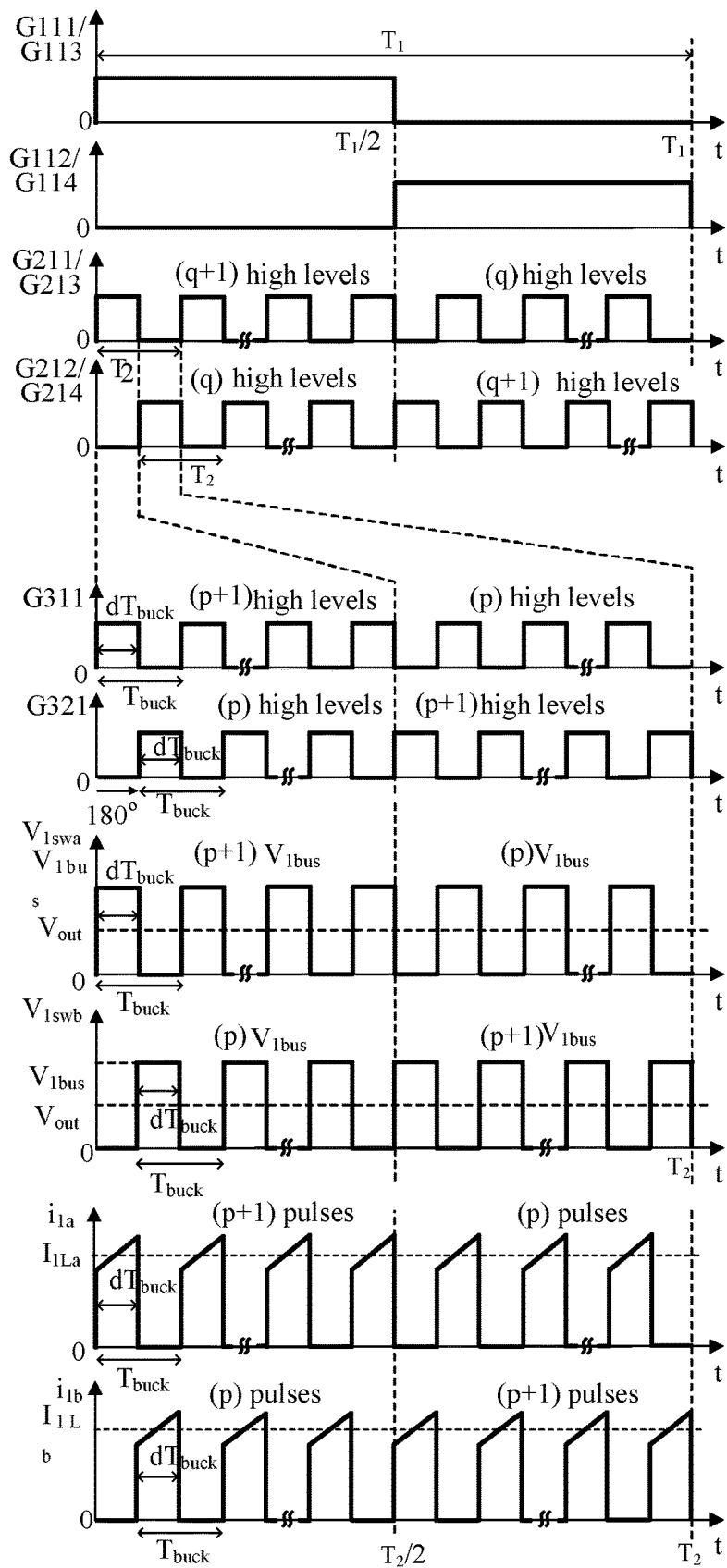
FIGS. 7A and 7B are waveform diagrams of first example operation of the second power conversion module, in accordance with embodiments of the present invention.
Figure 7B:
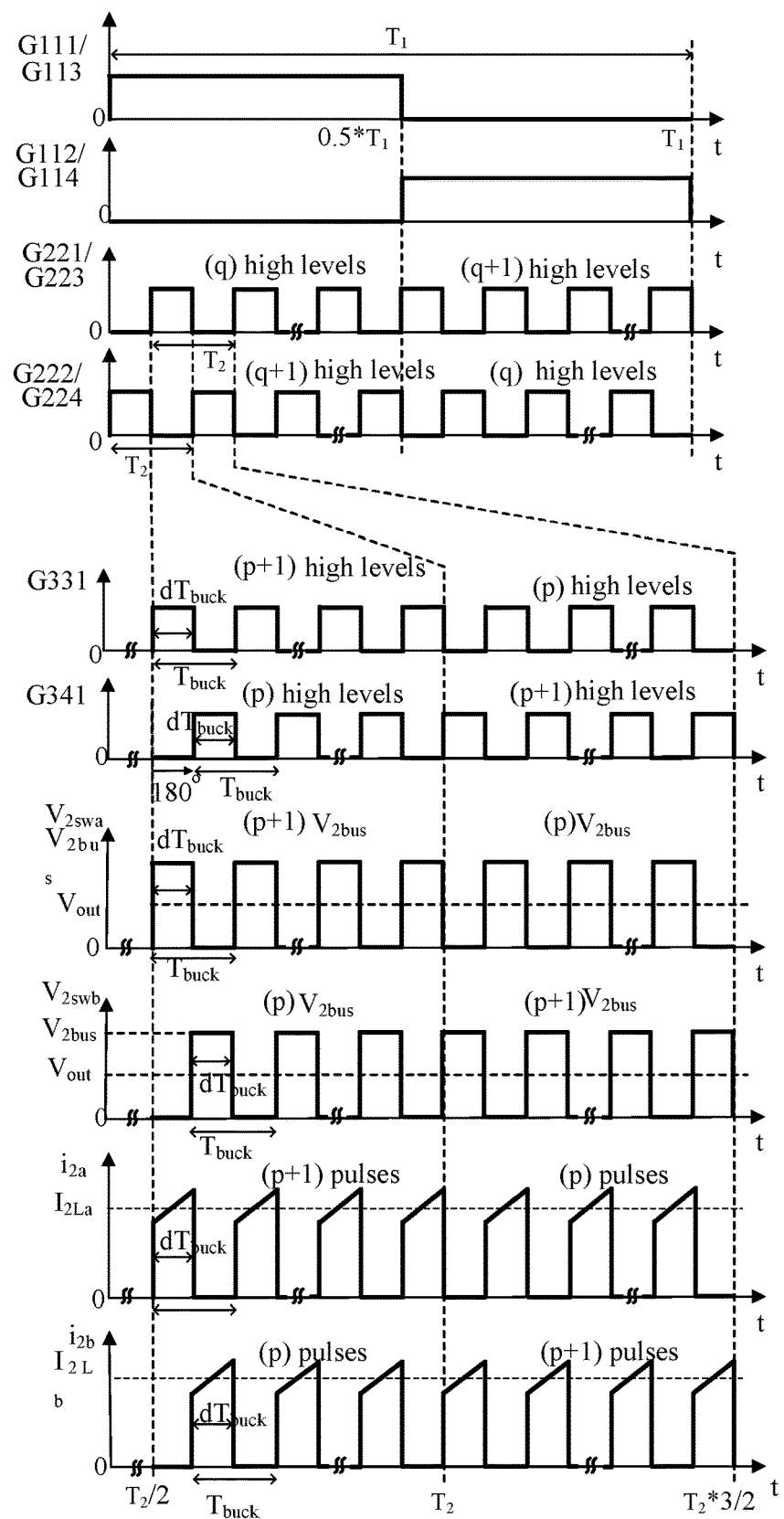

FIGS. 7A and 7B show the first working waveform schematic of the second power converter (N=3) according to the embodiment of the present disclosure, where when $f_2=(2q+1) f_1$, q=0, 1, 2, 3, and so on. The operating principle of the power converter is described below with reference to FIG. 6 and FIGS. 7A and 7B. As shown in FIG. 6, the voltage of the common input terminal of the first balance unit 1a and the second balance unit 1b is $V_{1bus}$, the voltage of the common terminal of the two switches Q311 and Q312 in the first balance unit is $V_{1swa}$, the voltage of the common terminal of the two switches Q321 and Q322 in the second balance unit is $V_{1swb}$, and the average output voltage of the power conversion module is $V_{out}$.

As shown in FIG. 7A, when driving signal G311 of switch Q311 in the first balance unit in the third-level structure is at a high voltage level, switch Q311 is turned on, and thus $V_{1swa}=V_{1bus}$. When driving signal G311 is at a low voltage level, switch Q311 is turned off, and thus $V_{1swa}=0$. When driving signal G321 of switch Q321 in the second balance unit in the third-level structure is at a high voltage level, switch Q321 is turned on, and thus $V_{1swb}=V_{1bus}$. When driving signal G321 is at a low voltage level, switch Q321 is turned off, and thus $V_{1swb}=0$.

In the interval [0, $T_1/2$], driving signals G111 and G113 of switch Q111 and switch Q113 in the first-level structure are at a high voltage level, switches Q111 and Q113 are turned on; and when driving signals G211 and G213 of switches Q211 and Q213 in the first basic unit in the second-level structure are also at a high voltage level, switches Q211 and Q213 are turned on, so $V_{1bus}=V_{in}-V_{C1}-V_{C21}$ at this time. When driving signals G111 and G113 of switches Q111 and Q113 in the first-level structure are at low voltage level in the interval [$T_1/2$, $T_1$], and when driving signals G211 and G213 of switches Q211 and Q213 in the first basic unit in the second-level structure are at high voltage level, switches Q111 and Q113 are turned off, and switches Q211 and Q213 are turned on, such that $V_{1bus}=V_{C1}-V_{C21}$. When driving signals G211 and G213 of switches Q211 and Q213 in the first basic unit in the second-level structure are at low voltage level, switches Q211 and Q213 are turned off, and at this time, $V_{1bus}=V_{C21}$. The voltage of the external power supply connected to the first end of the first basic unit 11 in the first-level structure is $V_{in}$.

Similarly, as shown in FIG. 6, the voltage of the common input terminal of the third balance unit 2a and the fourth balance unit 2b is $V_{2bus}$, the voltage of the common terminal of the two switches Q331 and Q332 in the third balance unit is $V_{2swa}$, and the voltage of the common terminal of the two switches Q341 and Q342 in the fourth balance unit is $V_{2swb}$. As shown in FIG. 7B, when driving signal G331 of switch Q331 in the third balance unit in the third-level structure is at a high voltage level, switch Q331 can be turned on, and thus $V_{2swa}=V_{2bus}$. When driving signal G331 is at a low voltage level, switch Q331 may be turned off, and thus $V_{2swa}=0$. When driving signal G341 of switch Q341 in the fourth balance unit in the third-level structure is at a high voltage level, switch Q341 can be turned on, and thus $V_{2swb}=V_{2bus}$. When driving signal G341 is at a low voltage level, switch Q341 may be turned off, and thus $V_{2swb}=0$. When driving signals G111 and G113 of switches Q111 and Q113 in the first-level structure are at high voltage level, and when driving signals G221 and G223 of switches Q221 and Q223 in the second basic unit in the second-level structure are at a high voltage level, switches Q111, Q113, Q221, and Q223 may be turned on. At this time, $V_{2bus}=V_{in}-V_{C1}-V_{C22}$.

When driving signals G111 and G113 of switches Q111 and Q113 in the first-level structure are at a low voltage level, and when the driving signals G221 and G223 of switches Q221 and Q223 in the second basic unit in the second-level structure are at a high voltage level, switches Q111 and Q113 can be turned off, and switches Q221 and Q223 turned on. At this time, $V_{2bus}=V_{C1}-V_{C22}$. When driving signals G111 and G113 are at a low voltage level and when the driving signals G221 and G223 of switches Q221 and Q223 in the second basic unit in the second-level structure are at a low voltage level, switches Q221 and Q223 can be turned off, and at this time, $V_{2bus}=V_{C22}$.

In FIGS. 7A and 7B, the rising edges of driving signal G311 of switch Q311 of the first balance unit in the third-level structure, and the rising edges of driving signal G211 of switch Q211 and driving signal G213 of switch Q213 of basic unit 21 in the second-level structure can be aligned with the rising edges of the driving signal G111 of switch Q111 and the driving signal G113 of switch Q113 in basic unit 11 in the first-level structure. For example, phase difference between driving signals G221 and G223 of switches Q221 and Q223 in basic unit 22 in the second-level structure and driving signals G111 and G113 is 180°. That is, the phase difference is $T_2/2$. For example, phase difference between driving signal of switch Q321 of the second balance unit and driving signal of switch G311 of the first balance unit in the third-stage structure is 180°. When the circuit operates in a steady state, the equations for the volt-second balance of the inductors $L_{1a}$, $L_{1b}$, $L_{2a}$, and $L_{2b}$ in the four balance units can be written respectively as follows:

$$\frac{1}{T_1}\int_0^{T_1} v_{1swa}dt = V_{out} \quad (12)$$

$$\frac{1}{T_1}\int_0^{T_1} v_{1swb}dt = V_{out} \quad (13)$$

$$\frac{1}{T_1}\int_0^{T_1} v_{2swa}dt = V_{out} \quad (14)$$

$$\frac{1}{T_1}\int_0^{T_1} v_{2swb}dt = V_{out} \quad (15)$$

The case where the duty ratio d of the driving signal of the first switch in each balance unit is less than or equal to 0.5 is described here. With reference to FIG. 7A, when $f_2=(2q+1)f_1$, where q=0, 1, 2, 3 . . . , equations (12) and (13) can be transformed into:

$$\frac{1}{T_1}[(V_{in}-V_{C1}-V_{C21})\cdot d\cdot T_{Buck}\cdot(p+1)\cdot(q+1)+ \quad (16)$$
$$(V_{C1}-V_{C21})\cdot d\cdot T_{Buck}\cdot(p+1)\cdot q + V_{C21}\cdot d\cdot T_{Buck}\cdot p\cdot(2q+1)] = V_{out}$$

$$\frac{1}{T_1}[(V_{in}-V_{C1}-V_{C21})\cdot d\cdot T_{Buck}\cdot p\cdot(q+1)+ \quad (17)$$
$$(V_{C1}-V_{C21})\cdot d\cdot T_{Buck}\cdot p\cdot q + V_{C21}\cdot d\cdot T_{Buck}\cdot(p+1)\cdot(2q+1)] = V_{out}$$

Similarly, the equations (14) and (15) can be transformed into:

$$\frac{1}{T_1}[(V_{in}-V_{C1}-V_{C22})\cdot d\cdot T_{Buck}\cdot(p+1)\cdot q + (V_{C1}-V_{C22})\cdot \quad (18)$$
$$d\cdot T_{Buck}\cdot(p+1)\cdot(q+1) + V_{C22}\cdot d\cdot T_{Buck}\cdot p\cdot(2q+1)] = V_{out}$$

$$\frac{1}{T_1}[(V_{in}-V_{C1}-V_{C22})\cdot d\cdot T_{Buck}\cdot p\cdot q + (V_{C1}-V_{C22})\cdot \quad (19)$$
$$d\cdot T_{Buck}\cdot p\cdot(q+1) + V_{C22}\cdot d\cdot T_{Buck}\cdot(p+1)\cdot(2q+1)] = V_{out}$$

Based on the four equations (16), (17), (18) and (19), the voltage balance of the flying capacitor can be proved. Further, the equation (20) can be obtained by combining the equations (16) and (17), the equation (21) can be obtained by combining the equations (18) and (19), and the equation (22) can be obtained by combining the equations (17) and (18).

$$V_{in}\cdot(q+1)=V_{C1}V_{C21}\cdot(4q+2) \quad (20)$$

$$V_{in}\cdot q+V_{C1}=V_{C22}\cdot(4q+2) \quad (21)$$

$$V_{in}\cdot(p-q)=V_{C1}\cdot(2p+1)-(V_{C21}+V_{C22})\cdot(2q+1) \quad (22)$$

The equation (23) can be obtained by combining the equations (20) with (21) and eliminating $V_{C1}$. The equation (24) can be obtained by merging the equation (23) into the equation (22).

$$V_{in}=2(V_{C21}+V_{C22}) \quad (23)$$

$$V_{C1}=V_{in}/2 \quad (24)$$

The equations (25) and (26) can be obtained by merging the equation (24) into the equation (20) and the equation (21).

$$V_{C21}=V_{C1}/2 \quad (25)$$

$$V_{C22}=V_{C1}/2 \quad (26)$$

Based on the foregoing, it can be proved that when $f_2=(2q+1)f_1$, where q=0, 1, 2, 3 . . . , flying capacitors $C_1$, $C_{21}$, and $C_{22}$ can achieve voltage balance. As illustrated below, it can be proved that when $f_2=(2q+1)f_1$, the output current balance problem of each balance unit is based on the ampere-second balance principle of the flying capacitors. FIG. 7A shows the waveform of the currents of the first balance unit 1a and the second balance unit 1b. The input current of balance unit 1a is $i_{1a}$, the input current of the second balance unit 1b is $i_{1b}$. The average values of the inductor currents output by the first balance unit 1a and the second balance unit 1b are $I_{L1a}$ and $I_{L1b}$, respectively. Similarly, FIG. 7B shows the waveform of the currents of balance unit 2a and the fourth balance unit 2b. The input currents of the third balance unit 2a and balance unit 2b are $i_{2a}$ and $i_{2b}$, respectively. The average values of the inductor currents output by the third balance unit 2a and the fourth balance unit 2b are $I_{L2a}$ and $I_{L2b}$, respectively.

First, it can be proved that when $f_2=(2q+1)f_1$, where q=0, 1, 2, 3 . . . , the output currents of the first balance unit 1a and the second balance unit 1b are equal. As shown in FIG. 7A, in one switching cycle [0, $T_2$] of the balance unit, flying capacitor $C_{21}$ can be charged in the first half of the switching cycle [0, $T_2/2$], flying capacitor $C_{21}$ may be discharged in the second half of the switching cycle [$T_2/2$, $T_2$], and the charge and discharge can be balanced in the steady state. For the ampere-second balance of flying capacitor $C_{21}$, the equation can be listed as follows:

$$\int_0^{T_2/2} i_{1a}dt + \int_0^{T_2/2} i_{1b}dt = \int_{T_2/2}^{T_2} i_{1a}dt + \int_{T_2/2}^{T_2} i_{1b}dt \quad (27)$$

No matter the duty ratio d of the driving signal of the first switch in the balance unit is >0.5 or ≤0.5, according to the currents $i_{1a}$ and $i_{1b}$ shown in FIG. 7A, the equation (27) can be converted into:

$$I_{L1a}\cdot T_{Buck}\cdot(p+1)+I_{L1b}\cdot T_{Buck}\cdot p = I_{L1a}\cdot T_{Buck}\cdot p + I_{L1b}\cdot T_{Buck}\cdot(p+1) \quad (28)$$

The equation (29) can be obtained by simplifying the equation (28):

$$I_{L1a}=I_{L1b} \quad (29)$$

Secondly, it can be proved that the output currents of the third balance unit 2a and the fourth balance unit 2b are equal. As shown in FIG. 7B, in one switching cycle [$T_2/2$, $T_2*3/2$] of the driving signal of the switch of the second level structure, flying capacitor $C_{22}$ may be charged in the first half of the switching cycle [$T_2/2$, $T_2$], flying capacitor $C_{22}$ can be discharged in the second half of the switching cycle [$T_2$, $T_2*3/2$], and the charge and discharge may be balanced in the steady state. For the ampere-second balance of flying capacitor $C_{22}$, the equation can be listed as follows:

$$\int_{T_2/2}^{T_2} i_{2a}dt + \int_{T_2/2}^{T_2} i_{2b}dt = \int_{T_2}^{T_2*3/2} i_{2a}dt + \int_{T_2}^{T_2*3/2} i_{2b}dt \quad (30)$$

No matter the duty ratio d>0.5 or d≤0.5 of the driving signal of the first switch in the balance unit is >0.5 or ≤0.5, the equation (31) can be obtained by bringing the specific expressions of $i_{2a}$ and $i_{2b}$ into the equation (30).

$$I_{L2a} \cdot T_{Buck} \cdot (p+1) + I_{L2b} \cdot T_{Buck} \cdot p = I_{L2a} \cdot T_{Buck} \cdot p + I_{L2b} \cdot T_{Buck} \cdot (p+1) \quad (31)$$

The equation (32) can be obtained by simplifying the equation (31).

$$I_{L2a} = I_{L2b} \quad (32)$$

In one switching cycle $[0, T_1]$ of the driving signal of the switch of the first level structure 11, the first capacitor C1 is charged in the first half of the switching cycle $[0, T_1/2]$, the first capacitor C1 is discharged in the second half of the switching cycle $[T_1/2, T_1]$, and the charge and discharge are balanced in the steady state. For the ampere-second balance of the first capacitor $C_1$, the equation can be listed as follows:

$$\int_0^{T_1/2} i_1 dt + \int_0^{T_1/2} i_2 dt = \int_{T_1/2}^{T_1} i_1 dt + \int_{T_1/2}^{T_1} i_2 dt \quad (33)$$

No matter the duty ratio d of the driving signal of the first switch in the balance unit is >0.5 or ≤0.5, the equation (34) can be obtained by bringing the specific expressions of $i_1$ and $i_2$ into the equation (33).

$$[I_{L1a} \cdot T_{Buck} \cdot (p+1) + I_{L1b} \cdot T_{Buck} \cdot p] \cdot (q+1) + \\ [I_{L2a} \cdot T_{Buck} \cdot (p+1) + I_{L2b} \cdot T_{Buck} \cdot p] \cdot q = \\ [I_{L1a} \cdot T_{Buck} \cdot (p+1) + I_{L1b} \cdot T_{Buck} \cdot p] \cdot q + \\ [I_{L2a} \cdot T_{Buck} \cdot (p+1) + I_{L2b} \cdot T_{Buck} \cdot p] \cdot (q+1) \quad (34)$$

The equation (35) can be obtained by bringing the equations (29) and (32) into the equation (34).

$$I_{L1a} = I_{L1b} = I_{L2a} = I_{L2b} \quad (35)$$

Figure 8A:
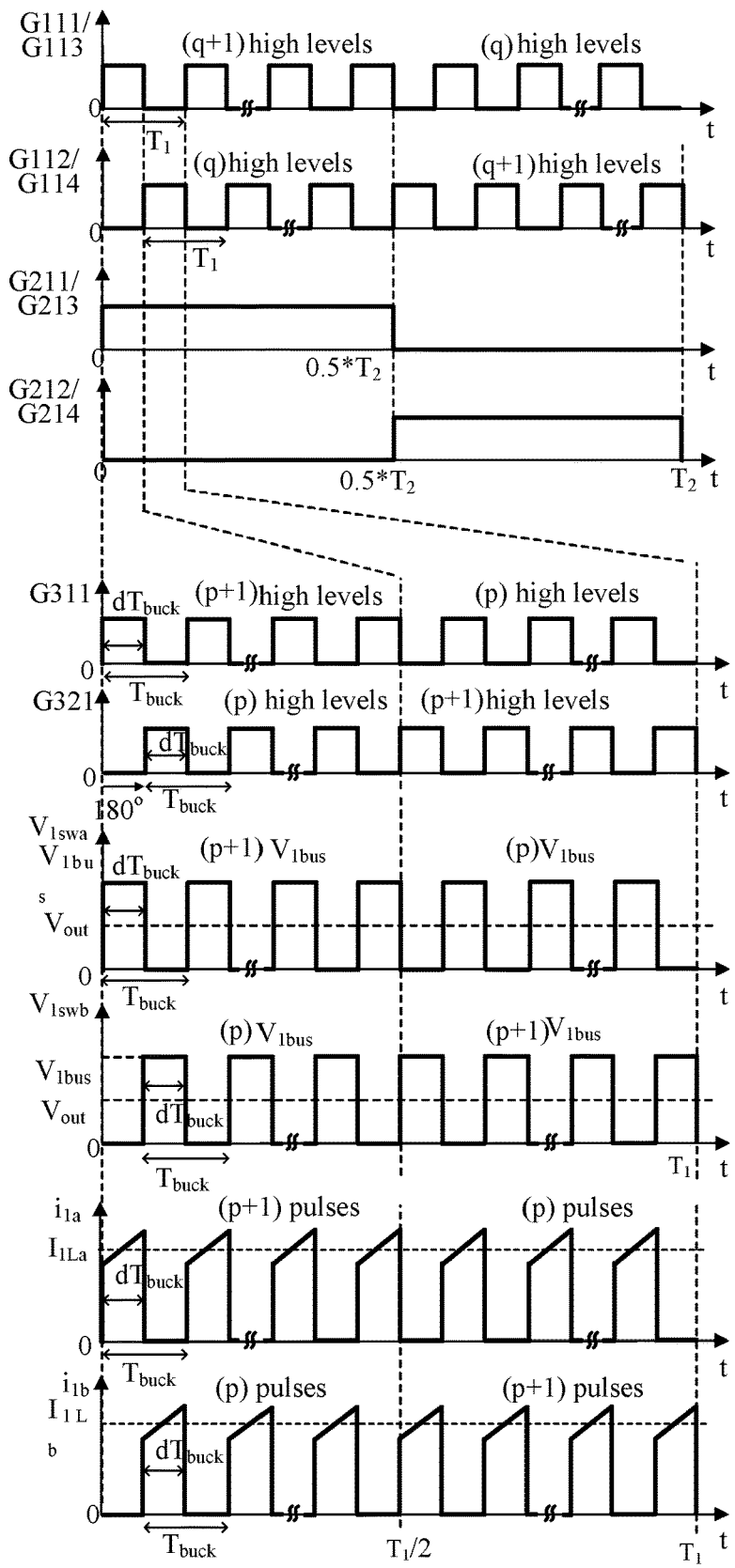
FIGS. 8A and 8B are waveform diagrams of second example operation of the second power conversion module, in accordance with embodiments of the present invention.
Figure 8B:
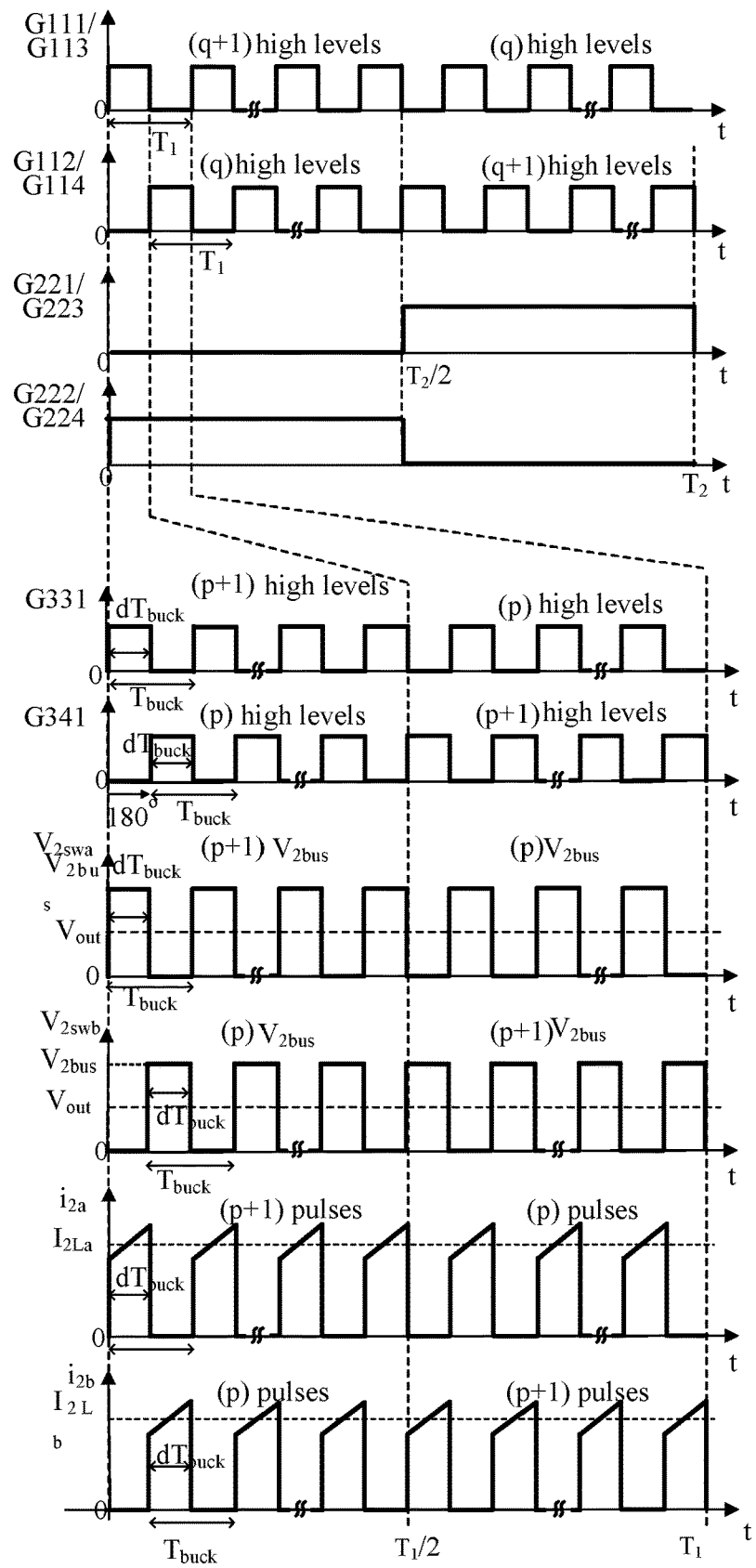

Based on the foregoing, it is proved that when $f_2=(2q+1) f_1$, where q=0, 1, 2, 3 . . . , the output currents of each balance unit are equal. It can be proved as follows that when $f_1=(2q+1) f_2$, where q=0, 1, 2, 3 . . . , the voltage of the flying capacitor can be automatically balanced. Referring now to FIGS. 8A and 8B, shown is a waveform diagram of second example operation of the second power conversion module, in accordance with embodiments of the present invention. In this example, $f_1=(2q+1) f_2$, q=0, 1, 2, 3, and so on.

The operating principle of the power converter is described below with reference to FIGS. 6, 8A, and 8B. FIG. 8A is the working waveform of the first balance unit and the second balance unit in the power converter shown in FIG. 6, and FIG. 8B is the working waveform of the third balance unit and the fourth balance unit in the power converter shown in FIG. 6. It can be realized from FIG. 8A that in a period of $[0, T_2]$, the volt-second balance equations listed for inductors $L_{1a}$ and $L_{1b}$ respectively can be transformed into:

$$\frac{1}{T_2}[(V_{in} - V_{C1} - V_{C21}) \cdot d \cdot T_{Buck} \cdot (p+1) \cdot (q+1) + (V_{C1} - V_{C21}) \cdot \\ d \cdot T_{Buck} \cdot p \cdot q + V_{C21} \cdot d \cdot T_{Buck} \cdot ((p+1) \cdot q + p \cdot (q+1))] = V_{out} \quad (36)$$

$$\frac{1}{T_2}[(V_{in} - V_{C1} - V_{C21}) \cdot d \cdot T_{Buck} \cdot p \cdot (q+1) + (V_{C1} - V_{C21}) \cdot d \cdot \\ T_{Buck} \cdot (p+1) \cdot q + V_{C21} \cdot d \cdot T_{Buck} \cdot (p \cdot q + (p+1) \cdot (q+1))] = V_{out} \quad (37)$$

Similarly, it can be realized from FIG. 8B that in a period of $[0, T_2]$, the volt-second balance equations listed for inductors $L_{2a}$ and $L_{2b}$ respectively can be transformed into:

$$\frac{1}{T_2}[(V_{in} - V_{C1} - V_{C22}) \cdot d \cdot T_{Buck} \cdot (p+1) \cdot q + (V_{C1} - V_{C22}) \cdot d \cdot \\ T_{Buck} \cdot p \cdot (q+1) + V_{C22} \cdot d \cdot T_{Buck} \cdot ((p+1) \cdot (q+1) + p \cdot q] = V_{out} \quad (38)$$

$$\frac{1}{T_2}[(V_{in} - V_{C1} - V_{C22}) \cdot d \cdot T_{Buck} \cdot p \cdot q + \\ (V_{C1} - V_{C22}) \cdot d \cdot T_{Buck} \cdot (p+1) \cdot (q+1) + \\ V_{C22} \cdot d \cdot T_{Buck} \cdot (p \cdot (q+1) + (p+1) \cdot q] = V_{out} \quad (39)$$

The equation (40) can be obtained by combining the equations (36) and (37), the equation (41) can be obtained by combining the equations (38) and (39), and the equation (42) can be obtained by combining the equations (37) and (38).

$$V_{in} \cdot (q+1) = V_{C1} \cdot (2q+1) + 2V_{C21} \quad (40)$$

$$V_{in} \cdot q + 2V_{C22} = V_{C1} \cdot (2q+1) \quad (41)$$

$$V_{in} \cdot p + V_{C21} + V_{C22} = V_{C1} \cdot (2p+1) \quad (42)$$

The equation (43) can be obtained by combining the equation (40) with the equation (41) and eliminating $V_{C1}$. The equation (44) can be obtained by merging the equation (43) into the equation (42).

$$V_{in} = 2(V_{C21} + V_{C22}) \quad (43)$$

$$V_{C1} = V_{in}/2 \quad (44)$$

The equations (25) and (26) can be obtained by bringing the equation (44) into the equations (40) and (41). As such, when $f_1=(2q+1) f_2$, the voltage balance of flying capacitors $C_1$, $C_{21}$ and $C_{22}$ can be proved. It can be proved as follows that when $f_1=(2q+1) f_2$, the output currents of each balance unit are equal. First, it can be proved that the output currents of the first balance unit 1a and the second balance unit 1b are equal. As shown in FIG. 8A, the charge and discharge balance is achieved in the steady state. No matter the duty ratio d of the driving signal of the first switch in the balance unit >0.5 or ≤0.5, according to the currents $i_{1a}$ and $i_{1b}$ shown in FIG. 8A, the ampere-second balance equation for flying capacitor $C_{21}$ can be converted into:

$$I_{L1a} \cdot T_{Buck} \cdot (p+1) + I_{L1b} \cdot T_{Buck} \cdot p = I_{L1a} \cdot T_{Buck} \cdot p + I_{L1b} \cdot T_{Buck} \cdot (p+1) \quad (45)$$

The equation (46) can be obtained by simplifying the equation (45).

$$I_{L1a} = I_{L1b} \quad (46)$$

In addition, based on the same reasons, since the charge and discharge balance is achieved in the steady state, no matter the duty ratio d of the driving signal of the first switch in the balance unit is >0.5 or ≤0.5, according to the currents $i_{2a}$ and $i_{2b}$ shown in FIG. 8B, the output currents of the third balance unit 2a and the fourth balance unit 2b are equal, and the ampere-second balance for $C_{22}$ can be obtained as the equation (47).

$$I_{L2a} \cdot T_{Buck} \cdot (p+1) + I_{L2b} \cdot T_{Buck} \cdot p = I_{L2a} \cdot T_{Buck} \cdot p + I_{L2b} \cdot T_{Buck} \cdot (p+1) \quad (47)$$

Then the equation (48) can be obtained by simplifying the equation (47).

$$I_{L2a} = I_{L2b} \quad (48)$$

In one switching cycle $[0, T_1]$ of the driving signal of the switch of the first level structure, capacitor $C_1$ is charged in the first half of the switching cycle $[0, T_1/2]$, t capacitor $C_1$ can be discharged in the second half of the switching cycle $[T_1/2, T_1]$, and the charge and discharge may be balanced in the steady state. As for the ampere-second balance equation (33) of capacitor $C_1$, no matter the duty ratio d of the driving signal of the first switch in the balance unit is >0.5 or ≤0.5, the equation (49) can be obtained by bringing the specific expressions of the currents $i_{1a}$, $i_{1b}$, $i_{2a}$ and $i_{2b}$ into the equation (33).

$$I_{L1a} \cdot d \cdot T_{Buck} \cdot (p+1) + I_{L1b} \cdot d \cdot T_{Buck} \cdot p = I_{L2a} \cdot d \cdot T_{Buck} \cdot p + I_{L2b} \cdot d \cdot T_{Buck} \cdot (p+1) \quad (49)$$

Bringing the equations (46) and (48) into the equation (49) can obtain the equation (35). It can be proved that when $f_1=(2q+1) f_2$, the output currents of each balance unit are equal.

Figure 9:
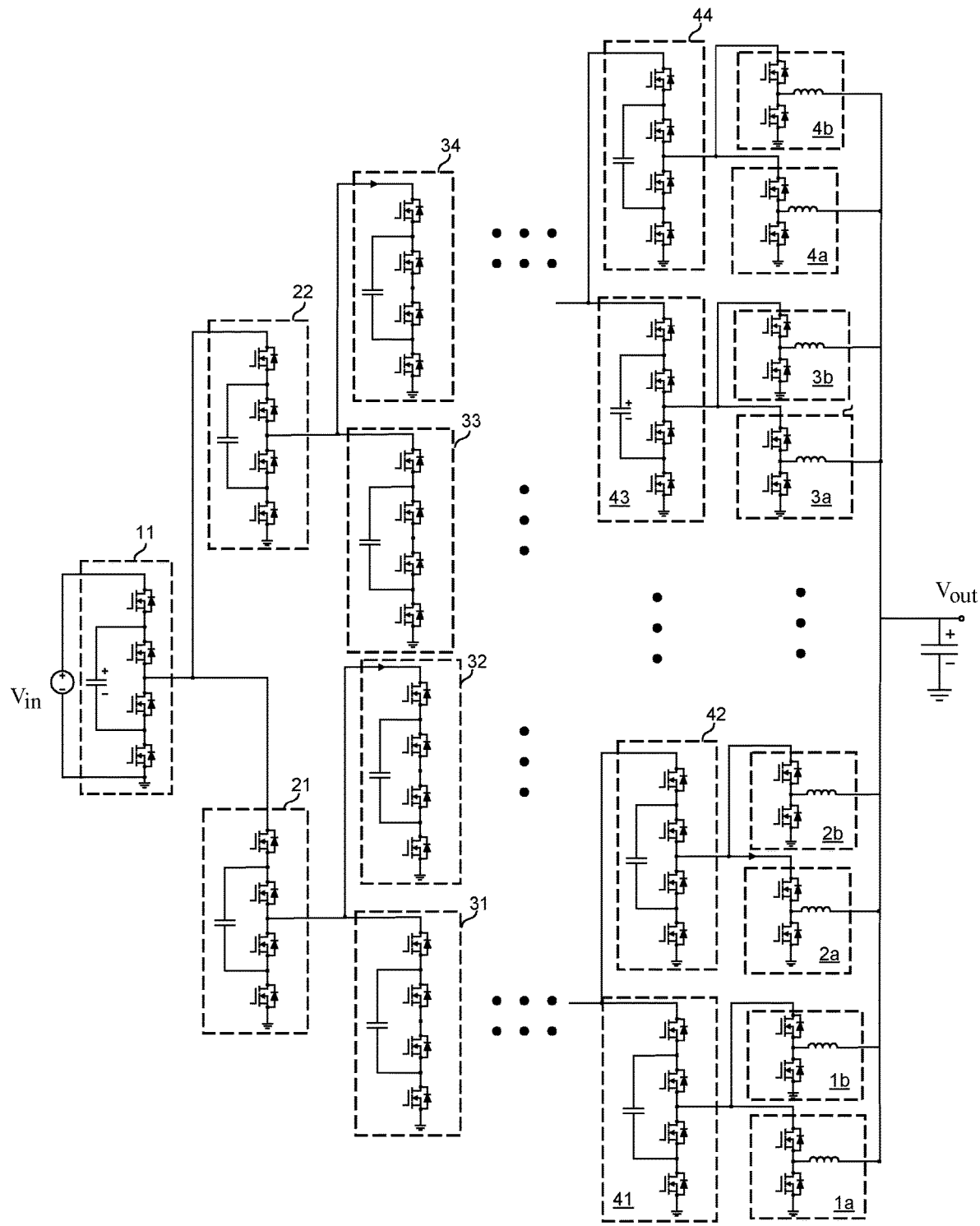
FIG. 9 is a schematic diagram of a third example power conversion module, in accordance with embodiments of the present invention.

Referring now to FIG. 9, shown is a schematic diagram of a third example power conversion module, in accordance with embodiments of the present invention. As shown in FIG. 9, in a more general situation, the power conversion module can include an N-level structure, and the i-th level structure can include $2^{i-1}$ basic units. The second terminal of each basic unit in each level structure is respectively connected with the first terminals of the two basic units in the next level structure. Namely, the output terminal of the m-th basic unit in the previous level structure is connected to the input terminal of the 2m-th basic unit and the (2m−1)-th basic unit in the subsequent level structure. The input terminal of the first basic unit in the first level structure is connected to an external power supply, where N is a positive integer greater than or equal to 2, i and m are both positive integers, and $1 \leq i \leq N-1$, $1 \leq m \leq 2^{i-1}$. The Nth level structure can include $2^{N-1}$ balance units, and the output terminals of each balance unit are connected as the output terminal of the power conversion module. The second terminals of each basic unit in the (N−1)th level structure are respectively connected to the first terminals of the two balance units in the Nth level structure. That is, the output terminal of the nth basic unit in the (N−1)th level structure is connected to the input terminals of the 2nth balance unit and the (2n−1)th balance unit in the Nth level structure, where n is a positive integer, and $1 \leq n \leq 2^{N-2}$.

The two first switches in the two basic units or balance units in the subsequent structure connected to the second terminal of the same basic unit in the previous structure are under phase-shifted control and the phase difference is, e.g., 180°. The duty ratio d of the driving signal of the first switch in each balance unit is equal. For example, the duty ratio of the driving signal of each switch in the basic units is 0.5. The switching states of the first switch and the third switch in each basic unit can be the same, and the switching states of the second switch and the fourth switch may be the same and complementary to the switching state of the first switch; the switching frequency of the previous basic unit is an odd multiple or an odd fraction of the switching frequency of the subsequent basic unit. The switching frequency of the balance unit can be an odd multiple of the highest switching frequency among all basic units. Regarding the first switch in one basic unit in the previous level structure, and the first switch in one of the basic unit or the balance unit in the subsequent level structure connected to the basic unit where the first switch in the previous level structure is located, the turn-on moments of the two first switches may be the same. Namely, the turn-on moment of the first switch in the m-th basic unit in the i-th level structure is the same as that of the first switch in the (2m−1)th or 2m-th basic unit in the (i+1)th level structure.

When the two first switches are both turned on at a high voltage level, the timings when the rising edges of the driving signals of the two first switches can be aligned. The output voltage $V_{out}$ of the power conversion module may be equal to $d \cdot V_{in}/2^{N-1}$, and the output voltage $V_{out}$ can be related to the number of levels N of the power conversion module and the duty ratio d of the driving signal of the first switch in the balance unit. Output voltage $V_{out}$ may be less than the input voltage $V_{in}$. When the duty ratio d is constant, the voltage conversion ratio can be increased more than the three-level Buck circuit in conventional approaches. Furthermore, when the level number N is increased, the voltage conversion ratio of the output voltage $V_{out}$ to the input voltage $V_{in}$ can be increased.

It can be deduced from N=2 and N=3 that the power converter of any level N can automatically achieve the voltage balance of the flying capacitors in the basic units of all levels. The voltage of the flying capacitor in the basic unit in the jth-level structure is stabilized at $V_{in}/2^j$, where $V_{in}$ is the input voltage of the first terminal of the power conversion module, j is a positive integer, $1 \leq j \leq N-1$. The output current of each balance unit can achieve current sharing. However, with the increase of the level N, the number of switches increases, and the reliability of the power conversion module will decrease. Therefore, in practical applications, power conversion modules/circuits with N=2 and N=3 are more common.

It should be noted that the switching frequency of the basic unit of the previous level can be an odd multiple or an odd fraction of the basic unit of the subsequent level. For each stage, when the switching frequency is increased, the capacitance value of the flying capacitor is decreased. As such, the size and cost of the flying capacitor can be reduced, but it also means that the switching loss increases. On the contrary, decreasing the switching frequency can reduce switching losses, but at the same time the flying capacitors with larger value are required. Therefore, the selection of the switching frequency of each level needs to be considered in association with the actual situation. In addition, the switch and capacitor with higher withstand voltage are required in the front level structures compared to those in the rear level structures, so the switching frequency should not be too high in the front level structures and the switching frequency can be higher in the rear level structures.

Figure 10:
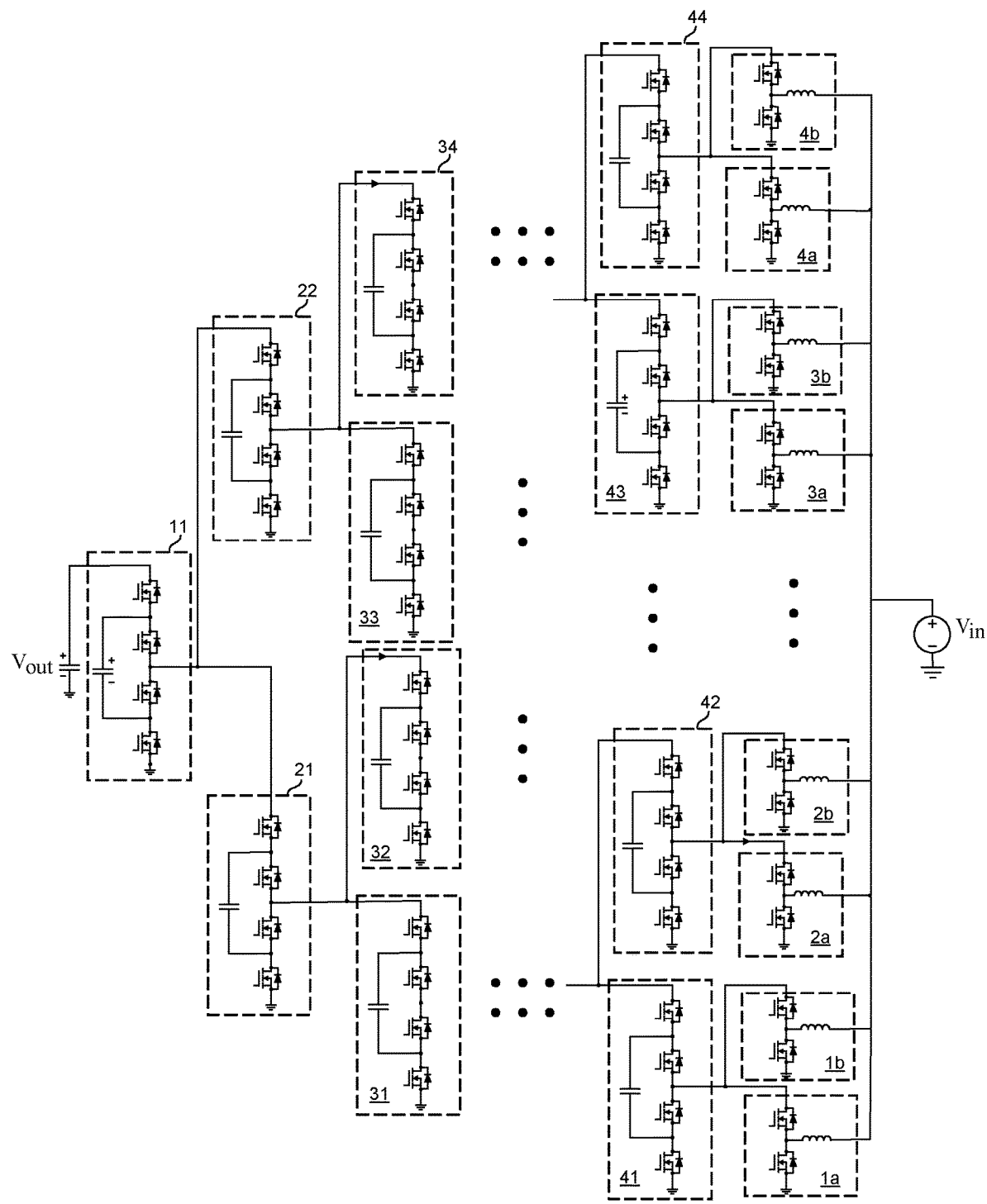
FIG. 10 is a schematic diagram of a fourth example power conversion module, in accordance with embodiments of the present invention.

Furthermore, in particular embodiments, the first terminal of the power conversion module is the input terminal to receive the external power supply, and the second terminal is the output terminal to output the signal. As shown in FIG. 10, when the second terminal of the power conversion module is the input terminal to receive external power supply, the first terminal of the power conversion module is the output terminal to output signals, that is, the input terminal and the output terminal of the power conversion module in the above embodiment are exchanged, the composition of the balance module and the basic unit in the structure of each level remains unchanged, and the relationship between the driving signals of the switches between the various levels remains unchanged. The only difference is that the currents of each balance unit and each basic unit flow in opposite directions, and the input and output terminals of each balance unit and each basic unit are exchanged. Namely, the balance unit is converted from a Buck circuit to a Boost circuit, the output voltage $V_{out}$ of the first terminal of the converted power conversion module is greater than the voltage $V_{in}$ of the external power supply input at the second terminal, and $V_{out}=2^{N-1} \cdot V_{in}/(1-d)$.

Particular embodiments can also include a power converter that can include a control module and the power conversion module described in the previous example. The control module can generate the driving signals for each switch in the power conversion module, and control the switching states of each switch in the power conversion module.

In particular embodiments, a power conversion module can be provided. The power conversion module can include N-level structures, and the i-th level structure can include $2^{i-1}$ basic units. The second terminal of each basic unit in each level structure can be respectively connected with the first terminals of the two basic units in the next level structure. The first terminal of the first basic unit in the first-level structure is used as the first terminal of the power conversion module, where N is a positive integer greater than or equal to 2, i is a positive integer, and 1≤i≤N−1. The N-th level structure can include $2^{N-1}$ balance units. The second terminals of each balance unit can be connected as the second terminal of the power conversion module. The second terminals of each basic unit in the (N−1)th level structure are respectively connected to the first terminals of the two balance units in the Nth level structure. The basic unit can include a switched capacitor circuit. By controlling the switching states of switches in each of the basic units and the balance units, when the power conversion module operates in a steady state, the voltage of the flying capacitor in the basic unit is substantially stable, and currents flowing through second terminals of each of the balance units are equal.

In particular embodiments, advantages of the three-level Buck DC-DC power converter, such as reducing the withstanding voltage of the power switch, using a smaller power inductor, and improving the power density, can be retained. In addition, particular embodiments may not require additional control strategies to ensure the current equalization of each inductor current, and can solve the problem that the voltage balance of the flying capacitors cannot be automatically achieved by the three-level Buck circuit. Further, a higher voltage conversion ratio can be provided without changing the duty ratio of the balance unit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power conversion module, comprising:
a) an i-th level structure comprising $2^{i-1}$ basic units, a second terminal of each basic unit in each level structure respectively connected to first terminals of two basic units in a next level structure, wherein a first terminal of a first basic unit in a first-level structure is used as a first terminal of the power conversion module;
b) an N-th level structure comprising $2^{N-1}$ balance units, wherein second terminals of each balance unit are connected as a second terminal of the power conversion module, and second terminals of each basic unit in an (N−1)th level structure are respectively connected to first terminals of two balance units in the N-th level structure;
c) wherein each basic unit comprises a switched capacitor circuit, N is a positive integer greater than or equal to 2, i is a positive integer, and 1≤i≤N−1; and
d) wherein an output voltage at an output terminal of the power conversion module is positively correlated to the number of levels of the power conversion module and to a duty ratio of a driving signal of a first switch in the balance unit.

2. The power conversion module of claim 1, wherein:
a) the balance unit comprises a first switch and a second switch connected in series between the first terminal of the balance unit and a reference ground and an inductor; and
b) a common connection node of the first switch and the second switch is connected to a first terminal of the inductor, and a second terminal of the inductor is connected to the second terminal of the balance unit.

3. The power conversion module of claim 2, wherein the second switch comprises a diode.

4. The power conversion module of claim 1, wherein:
a) each basic unit comprises a first switch, a second switch, a third switch, and a fourth switch, sequentially connected in series between the first terminal of the basic unit and a reference ground and a flying capacitor;
b) the flying capacitor is connected between a first connection node and a second connection node;
c) the first connection node is a common connection node of the first switch and the second switch;
d) the second connection node is a common connection node of the third switch and the fourth switch; and
e) a common connection node of the second switch and the third switch is the second terminal of the basic unit.

5. The power conversion module of claim 4, wherein when the power conversion module is in a steady state, a voltage of the flying capacitor in the jth-level structure is stabilized at $V_{in}/2^j$, wherein $V_{in}$ is a voltage of the first terminal of the power conversion module, j is a positive integer, and 1≤j≤N-1.

6. The power conversion module of claim 1, wherein the first terminal of the power conversion module is an input terminal connected to an external power supply, and the second terminal of the power conversion module is the output terminal.

7. The power conversion module of claim 1, wherein the second terminal of the power conversion module is an input terminal connected to an external power supply, and the first terminal of the power conversion module is the output terminal.

8. A power converter, comprising a control module and the power conversion module of claim 1, wherein the control module is configured to generate driving signals for each switch in the power conversion module, in order to control switching states of each switch in the power conversion module.

9. The power converter of claim 8, wherein the control module is configured to control first switches in two balance units connected to the second terminal of the same basic unit in the (N-1)th level structure to be turned on with a phase difference of 180°.

10. The power converter of claim 8, wherein the control module is configured to control duty ratios of first switches in each balance unit to be the same.

11. The power converter of claim 8, wherein:
a) the control module is configured to control switching states of a first switch and a third switch in each basic unit to be the same, and to control switching states of a second switch and a fourth switch to be the same and complementary to the switching state of the first switch; and b) the first to the fourth switches are sequentially connected in series between the first terminal of the basic unit and a reference ground.

12. The power converter of claim 8, wherein the control module is configured to control first switches in two basic units that are connected to a second terminal of the same basic unit in the subsequent level structure to be turned on with a phase difference of 180°.

13. The power converter of claim 8, wherein the control module is configured to control duty ratios of each switch in each basic unit to be equal to 0.5.

14. The power converter of claim 8, wherein the control module is configured to control switching frequencies of each switch in the basic units in the adjacent two-level structure to satisfy: the switching frequency of the basic unit of previous level is k times or 1/k of the switching frequency of the basic unit of next level, wherein k is an odd integer.

15. The power converter of claim 8, wherein the control module is configured to control a switching frequency of each switch in the balance unit is an odd multiple of the highest switching frequency of the first level to the (N-1)th level structures.

16. The power converter of claim 8, wherein the control module is configured to control turn-on moments of a first switch in the basic unit in the previous level structure and a first switch in one of the basic unit or the balance unit in the next level structure connected to the basic unit in the previous level structure to be the same.

17. A power conversion module, comprising:
a) an i-th level structure comprising $2^{i-1}$ basic units, a second terminal of each basic unit in each level structure respectively connected to first terminals of two basic units in a next level structure, wherein a first terminal of a first basic unit in a first-level structure is used as a first terminal of the power conversion module;

b) an N-th level structure comprising $2^{N-1}$ balance units, wherein second terminals of each balance unit are connected as a second terminal of the power conversion module, and second terminals of each basic unit in an (N-1)th level structure are respectively connected to first terminals of two balance units in the N-th level structure;

c) wherein each basic unit comprises a switched capacitor circuit, N is a positive integer greater than or equal to 2, i is a positive integer, and $1 \leq i \leq N-1$; and d) wherein an output voltage at an output terminal of the power conversion module is negatively correlated to the number of levels of the power conversion module and positively correlated to a duty ratio of a driving signal of a first switch in the balance unit.

18. The power conversion module of claim 17, wherein:
a) the balance unit comprises a first switch and a second switch connected in series between the first terminal of the balance unit and a reference ground and an inductor; and b) a common connection node of the first switch and the second switch is connected to a first terminal of the inductor, and a second terminal of the inductor is connected to the second terminal of the balance unit.

19. The power conversion module of claim 18, wherein the second switch comprises a diode.

20. The power conversion module of claim 17, wherein:
a) each basic unit comprises a first switch, a second switch, a third switch, and a fourth switch, sequentially connected in series between the first terminal of the basic unit and a reference ground and a flying capacitor;

b) the flying capacitor is connected between a first connection node and a second connection node;

c) the first connection node is a common connection node of the first switch and the second switch;

d) the second connection node is a common connection node of the third switch and the fourth switch; and e) a common connection node of the second switch and the third switch is the second terminal of the basic unit.

* * * * *